Sept. 23, 1930.   O. A. FREDERICKSON   1,776,656
UNDERFLOOR CONDUIT SYSTEM
Filed April 9, 1928
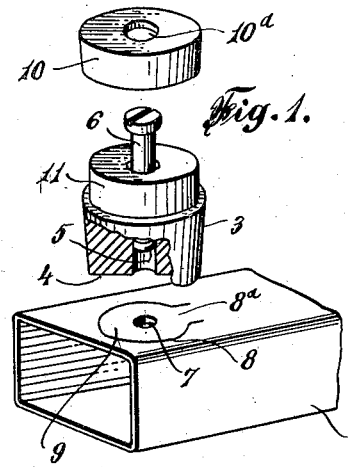
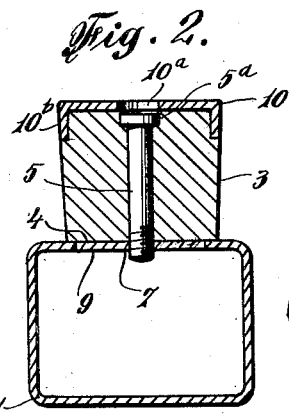
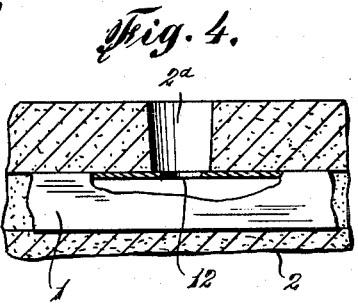
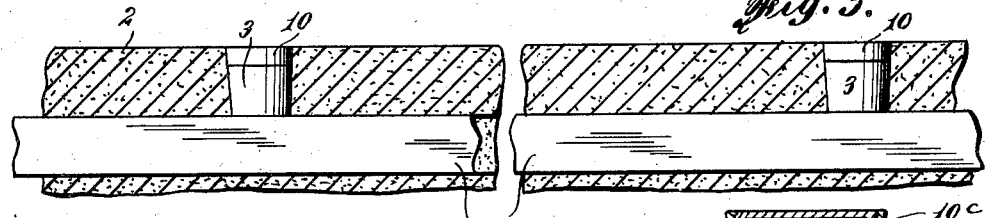
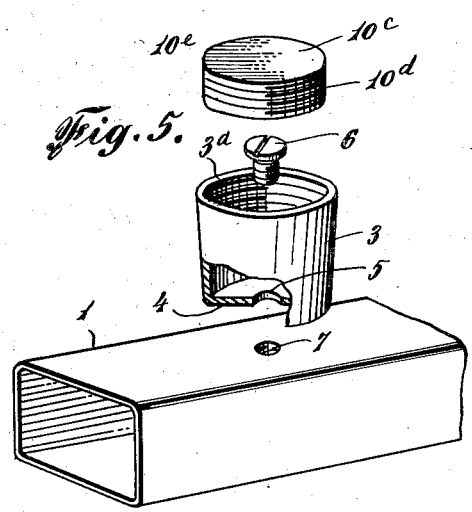
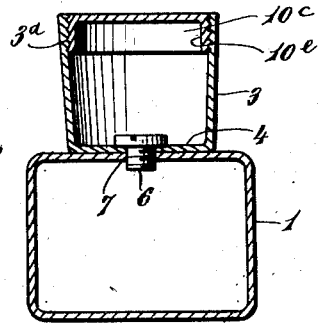
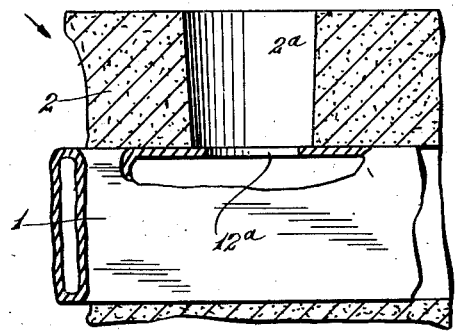
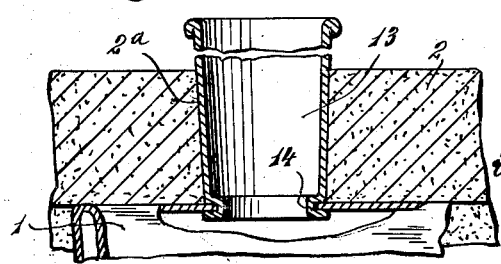
INVENTOR
O. A. Frederickson
BY
T. F. Bourne
ATTORNEY Patented Sept. 23, 1930

1,776,656

UNITED STATES PATENT OFFICE

OTTO ARTHUR FREDERICKSON, OF WETHERFIELD, CONNECTICUT, ASSIGNOR, BY MESNE ASSIGNMENTS, TO NATIONAL ELECTRIC PRODUCTS CORPORATION, OF NEW YORK, N. Y., A CORPORATION OF DELAWARE

UNDERFLOOR CONDUIT SYSTEM

Application filed April 9, 1928. Serial No. 268,449.

My invention relates to improvements in systems of electrical distribution in which conduits or ducts are embedded in floor structures and branch connections are made from such conduits through the floor. In some such systems the conduits have been exposed at the floor surface and outlet openings have been formed in such conduits for branch connections, and in another such system the conduits have been buried beneath the floor surface and openings have been drilled through the floor and through the conduit for making branch connections through such openings. The drilling of the concrete floor is more or less expensive and the concrete becomes injured to some extent surrounding the passages drilled therein, cementing around the passages being required in some instances to restore the floor to proper condition, and bushings are inserted through the passages and connected with the openings in the conduits. Another system embodies tubular inserts attached to the conduits in spaced relation prior to installation of the conduits in the floor structure, and the latter has been brought up substantially to the level of the outer ends of the inserts. Where the conduits are provided with the spaced inserts a relatively large number of the latter are more or less wasted in use, because more inserts are provided than outlets are made from the conduits, and such excess inserts increase the cost of the conduits and the installation of the system.

The object of my invention is to provide a conduit or duct that may be used in an underfloor system of electrical distribution with means detachably connected with the conduit that will provide pre-formed passages in the flooring, which means may be removed from such passages and from the conduit so that openings may be made through such pre-formed passages into the conduit to permit branch connection to be made with conductors within the conduit, which means in themselves are not inserts or bushings to be used for the branch connections.

My invention comprises novel details of improvement that will be more fully hereinafter set forth and then pointed out in the claims.

Reference is to be had to the accompanying drawings forming a part hereof, wherein Fig. 1 illustrates my improved conduit and its parts separated;

Fig. 2 is a cross section of my improved conduit;

Fig. 3 is a longitudinal section through a floor structure, illustrating my improved conduit therein;

Fig. 4 is a sectional detail illustrating a pre-formed passage in the flooring from which a plug has been removed to permit access to the conduit;

Fig. 5 is a view similar to Fig. 1, illustrating a modification;

Fig. 6 is a section through the conduit of Fig. 5;

Fig. 7 is a sectional view illustrating an opening formed in the conduit through the pre-formed passage in the floor, and Fig. 8 is a sectional detail illustrating a bushing within the passage in the floor and connected to the conduit at the outlet opening therein.

Similar numerals of reference indicate corresponding parts in the several views.

The numeral 1 indicates a conduit which may be of any suitable or desired construction adapted to be embedded in a concrete or analogous floor or wall structure 2. At 3 are plugs detachably connected to a wall of the conduit, any desired number of the plugs being provided in suitably spaced relation along the conduit. Said plugs are shown in cylindrical form having inner ends at 4 adapted to rest against the adjacent wall of the conduit. The plugs are shown provided with passages or openings at 5 through which screws 6 may be passed to engage threads in openings 7 in the conduit for detachably securing the plugs to the latter. In the form shown in Figs. 1, 2 and 3, the plug is solid except for the passage 5 and a recess $5^a$ at the outer end to countersink the screw head, and the conduit is weakened or cut at 8, with an uncut portion at $8^a$, providing a knockout at 9 retained by the portion $8^a$, The knockout has a threaded opening 7 for screw 6. When the parts are assembled, as shown in Figs. 2 and 3, the plug will be secured to the knockout 9 by screw 6, and preferably the base of the plug will be wider than the knockout to rest upon the top wall of the conduit, whereby the plug is detachably secured to the conduit. A ferrule or cap 10 may be secured on the plug friction tight and may have an opening at 10$^a$ to admit a screwdriver to operate screw 6. Said plugs may be of wood or other suitable material, and may be provided with reduced outer ends, at 11, to receive the flanges 10$^b$ of the ferrules, providing smooth outer surfaces along the plugs.

In the form shown in Figs. 5 and 6 the plugs are hollow, in cup-like form, with their inner ends or bases secured to the conduit by the screws 6, and the ferrules or caps 10$^c$ are shown provided with external threads at 10$^d$ along their flanges 10$^e$ to engage internal threads 3$^a$ at the outer ends of the plugs, (Fig. 6). The ferrules or caps 10$^c$ may be removed from the plugs to permit access of a screwdriver to the screws 6 to attach the plugs to the conduit and for removal of the plugs therefrom. The plugs or cups may be made of relatively cheap material so that the cost of the completed conduit with the plugs or cups will be relatively low.

The plug of Figs. 1 and 2 may be used on the conduit of Figs. 5 and 6, and the plug of Figs. 5 and 6 may be used on the conduit of Figs. 1 and 2. When a plug is to be removed from the conduit a screw driver may be used for removal of the screw 6 from the conduit, whereby the plug may be lifted from the conduit, providing a pre-formed passage 2$^a$ in the concrete, through which branch connections may be made from conductors within the conduit.

The conduit may be embedded in a floor or wall structure in any well known way, such as by resting the conduit upon a rough slab of the floor or on suitable seats, with the plugs 3 fitted to the conduit, and the floor or wall material will be laid so as to be substantially flush with the tops of the plugs, the concrete or cement being properly laid around the plugs with their ferrules or caps exposed. When it is desired to make a branch connection to a conductor in the conduit the corresponding screw 6 will be unscrewed from the conduit, thereby releasing the plug therefrom, and the latter may be withdrawn from the pre-formed passage 2$^a$ in the floor, which passage will open through the floor or wall surface, indicated in Figs. 4 and 7. The opening 7 in the conduit will preferably be in the axial center of the passage 2$^a$ in the floor or wall 2. In the form shown in Figs. 1, 2 and 3 the knockout 9 will be removed, and the edges of the opening 12, (formed in the conduit by the removal of the knockout), may be smoothed by a suitable tool. In the form shown in Figs. 5 and 6, after the plug 3 has been removed an outlet opening 12$^a$ may be drilled in the conduit through the passage 2$^a$, as indicated in Fig. 7, the opening 7 in the conduit serving as a pilot for the drill or cutter and to indicate the center of the passage 2$^a$. After the opening has been formed in the conduit a bushing or fitting 13 may be passed through the passage 2$^a$ in the floor or wall and connected with the opening in the conduit to secure the bushing thereto in any desired way, such as by upsetting the metal at the inner end of the bushing, as indicated at 14 in Fig. 8, to securely attach the bushing to the conduit.

In accordance with my improvement conduits or ducts may be installed in any desired connected relation within floor and wall structures with pre-formed passages 2$^a$ in the latter produced by the presence of the plugs 3 in the concrete, permitting any of the desired plugs to be removed so that a corresponding opening may be formed in the conduit for making branch electrical connections without disturbing the concrete or any of the other plugs along the conduit until access to the conduit is required at any other position. Since the plugs 3 may be made of material much cheaper than finished bushings 13 it will be apparent that the cost of the conduits with their plugs attached will be cheaper than with conduits to which permanent inserts are attached prior to installation in the floor or wall, since such of said more costly permanent inserts as are not used for branch connections and which are permanently installed in the floor or wall entail increased cost, as only such bushings 13 as are required for a particular outlet or branch connection are required to be fitted to a conduit in my improved electrical distribution system.

Having now described my invention what I claim is:—

1. A conduit for a system of electrical distribution having spaced plugs, and screws passing through openings in the plugs for detachably securing said plugs to the conduit, said plugs projecting from the exterior of the conduit in position to provide pre-formed passages in the structure in which the conduit and the plugs are embedded, said passages affording access to the conduit for the removal of conduit material and also affording an opening to and through the conduit after the conduit material has been removed for the passage of wires from the conduit through the passages formed by the removal of the plugs.

2. A conduit for a system of electrical distribution provided with spaced plugs thereon, said plugs having bases against the conduit, and screws detachably connecting the plugs with the conduit, said screws having their heads within the plugs and their shanks passing through the plugs, the plugs projecting from the conduit in position to provide pre-formed passages in a structure in which the conduit and the plugs are embedded, said passages affording access to the conduit for the removal of conduit material and also affording an opening to and through the conduit after the conduit material has been removed for the passage of wires from the conduit through the passages formed by the removal of the plugs.

3. A conduit provided with spaced threaded openings in a wall, plugs against said wall having openings registering with the openings in the conduit, and screws passing through the openings in the plugs and engaging the threads in the openings in the conduit for detachably connecting the plugs with the conduit, said screws providing for the removal of a plug so that the underlying conduit material may be accessible for removal whereupon after removal of such conduit material a passage is provided through the wall of the conduit.

4. A conduit provided with a knockout, a plug upon the knockout, and means to secure the plug to the knockout.

5. A conduit as set forth in claim 4 in which the base of the plug is wider than the knockout and rests against the conduit.

6. A conduit provided with a knockout having a threaded opening, a plug upon the knockout, and a screw extending from the plug and engaging the threads in said opening for detachably connecting the plug with the knockout.

7. A conduit as set forth in claim 6 in which the base of the plug is wider than the knockout and rests against the conduit.

8. A concealed electrical distribution system for poured building structures comprising a poured slab, a conduit wholly embedded in the slab at a substantial distance from the slab surfaces, plugs removably attached to a wall of the conduit, and extending from the wall to a surface of the slab, said plugs being attached to the conduit by screws which are independent of the plugs and which pass through an opening in said plugs and engage threaded apertures in the conduit, the plugs being so shaped as to facilitate their removal, intact from the structure after the material of the slab has set.

9. A concealed electrical distribution system for poured building structures comprising a poured slab, a conduit wholly embedded in the slab at a substantial distance from the slab surfaces, plugs removably attached to a wall of the conduit, and extending from the wall to a surface of the slab, said plugs being attached to the conduit by screws which are independent of the plugs and which pass through an opening in said plugs and engage threaded apertures in the conduit, the plugs being so shaped as to facilitate their removal, intact from the structure after the material of the slab has set and ferrules surrounding the ends of the plugs flush with the slab surface.

OTTO ARTHUR FREDERICKSON.